N. H. CEDERQUIST.
GLAZIER'S JOINT.
APPLICATION FILED JAN. 4, 1911.
1,062,818.
Patented May 27, 1913.
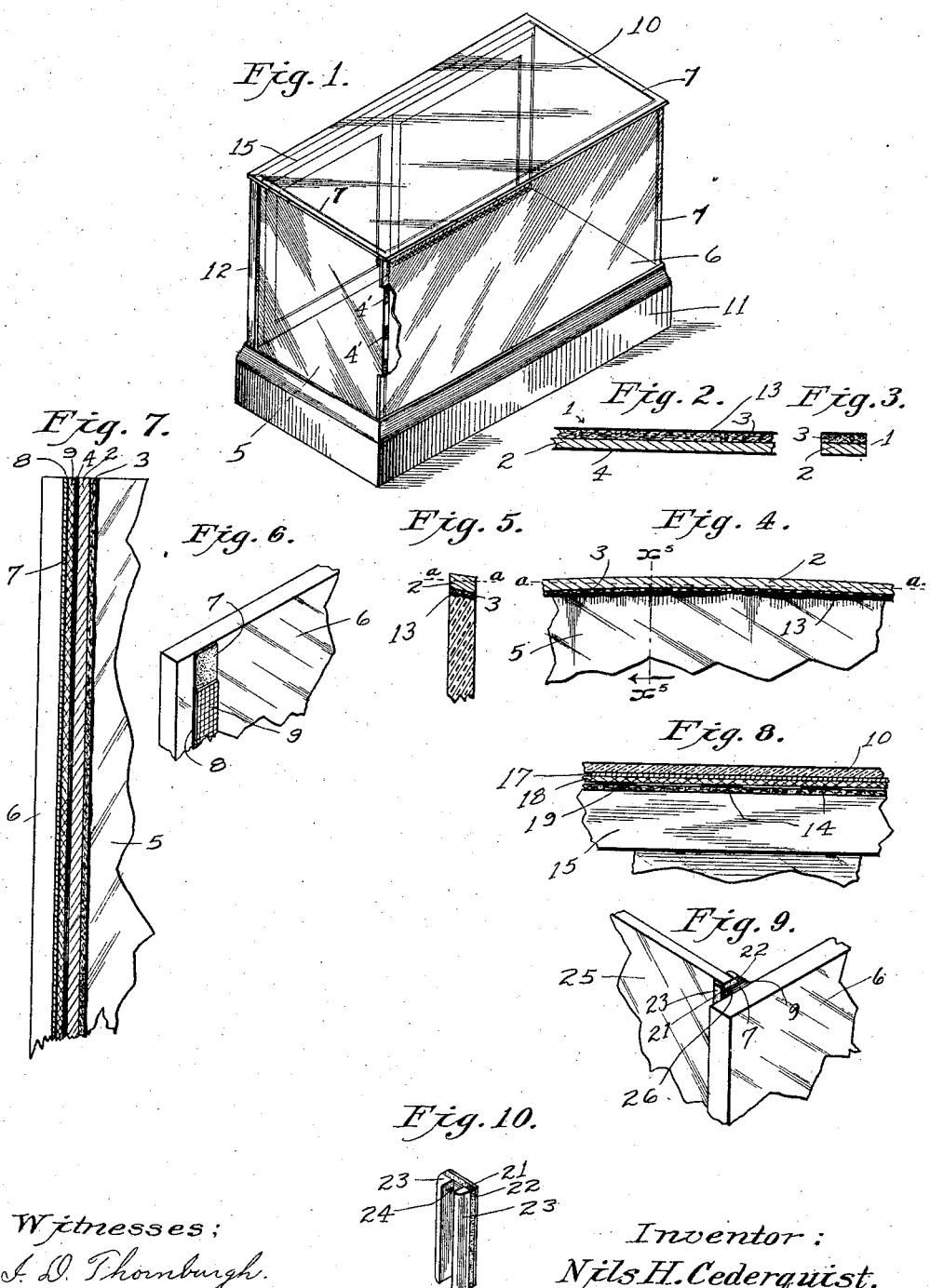
Witnesses:
J. D. Thornburgh
Lute D. Alter
Inventor:
Nils H. Cederquist
By 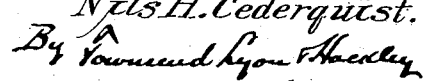
His Attorneys form the case or may be separated without
UNITED STATES PATENT OFFICE.

NILS H. CEDERQUIST, OF WEST ALHAMBRA, CALIFORNIA, ASSIGNOR OF ONE-HALF TO ROBERT A. PULFER, OF LOS ANGELES, CALIFORNIA.

GLAZIER'S JOINT.

1,062,818.  Specification of Letters Patent.  Patented May 27, 1913.

Application filed January 4, 1911. Serial No. 600,846.

*To all whom it may concern:*

Be it known that I, NILS H. CEDERQUIST, a citizen of the United States, residing at West Alhambra, in the county of Los Angeles and State of California, have invented a new and useful Glazier's Joint, of which the following is a specification.

This invention relates to joints for "all glass" show-cases, and other purposes, and particularly to means for joining the glass plates in such a case to one another and to the frame at the back of the case, or generally for joining glass plates to a supporting member.

The main object of the invention is to provide means for fastening the glass plates in such manner that they may be assembled to form the case or may be separated without requiring special skill, so that the plates, frame and base may be shipped "knocked-down" and may be assembled at the place where the case is to be used, and any plate may be removed at any time without interfering with the others. By providing for shipping the cases in "knocked-down" condition, the expense of shipment and repair and liability of breakage are largely reduced.

Another object of the invention is to provide a show-case of this character in which the glass plates may be thinner than the ordinary plate glass, for example, "double strength glass" being used for the sides and front of the case, and presenting the same uniform appearance as a plate glass case.

Other objects of the invention will appear hereinafter.

The accompanying drawings illustrate the invention, and referring thereto:—Figure 1 is a perspective of a show-case provided with my improved joint. Fig. 2 is a longitudinal section, and Fig. 3 a transverse section of a strip used in attaching the glass plates of the case. Fig. 4 is an elevation of a portion of one of the plates showing the strip attached thereto preliminary to the finishing thereof. Fig. 5 is a transverse section on line $x^5$—$x^5$ in Fig. 4. Fig. 6 is a perspective of a portion of the glass plate, showing an opaque layer therein. Fig. 7 is an end elevation of a glass plate and a side portion of another glass plate with the strips and layer on said plates for attachment of said plates together. Fig. 8 is a vertical section of the top plate showing the manner of attachment to the frame bar. Fig. 9 is a perspective of the corner joint used with relatively thin glass plates. Fig. 10 is a perspective of the strip used for relatively thin glass plates.

The joint comprises a cementing strip 1 (Figs. 2 and 3), formed with a layer or strip of wood 2, and a layer or strip 3, of felt or other fabric or tough material presenting tensile strength in a lateral direction, that is to say, transverse to the grain of the wood, said grain extending longitudinally of the strip 2, said felt strip being cemented to the wood strip and holding the same against transverse or splitting strains. The said strip 3 is secured to the edge of the glass, for example, a plate 5, by cementing the felt side of the strip to the edge of the glass as shown at 13 in Figs. 4 and 5. In this operation, the cement takes up any small inequalities or roughness in the face of the glass, but it will be understood that larger inequalities due, for example, to a general convexity or concavity or gradual undulation in the edge of the glass, will be accommodated by the strip as a whole, the strip bending to conform to the general shape of the glass and twisting laterally to conform to any canting or obliquity in the edge of the glass. In cutting glass plates of this character it generally occurs that there is more or less deviation from a straight line on one or both sides, particularly on the edge away from the cutting scone, and the wooden portion 2 of the strip 1 is made sufficiently thick to compensate or allow for any such deviations in the edge of the glass. Moreover, this strip 1 will present a uniform width irrespective of any variation in the thickness of the glass, thus improving the appearance of show cases, for example, on which it is used. This strip being substantially unitary with the glass also acts as a reinforce, strengthening the glass and preventing the glass from starting to split at the edge.

When the strip has been attached to the glass, as stated, its outer face is trued or rectified by running a finishing plane over the edge to reduce the outer edge of the wooden strip producing a true flat surface, as indicated by dotted lines *a*—*a* in Figs. 4 and 5. This operation dispenses with the grinding operation which is generally adopted where the plates are to be cemented directly together, or with only an intervening felt strip.

The outer edge of the strip 1, finished as stated, is coated with a layer 4 of any suitable cementing material, adapted to be softened by solvent or heat, said coating being hard and nonadhesive as the plates are sent from the factory, but being adapted to be softened as hereinafter set forth in attaching the plates.

The plate 6 which is to be secured to the edge of the plate above referred to is provided on one face thereof with a coating of opaque material, along the line for the joint this coating serving to conceal the final joint at which the members are cemented together and also serving as a marking strip, indicating the line on which the members are to be joined. In order to give a uniform appearance of this joint as viewed through the glass, I prefer to coat the glass plate along the line of the joint with an opaque layer such as with cement or paint, indicated at 7, and to apply over this opaque layer a protective strip of cloth indicated at 9 in Fig. 6, secured in place by applying cement indicated at 8, to the coating 7.

The joint is formed by attaching the members above described together, as shown in Fig. 7. For this purpose it is only necessary to soften the outer cement coating 4 by solvent or otherwise, at intervals corresponding to the points where attachment is to be effected. The members are then brought together as shown in Fig. 7 and held temporarily until the cement hardens, and a secure joint is formed in which the attachment of the members is only at more or less separated points indicated at 4', this construction presenting the advantage that the joint may be separated or opened at any time by slipping in a thin knife blade in the joint at parts where there is no cemented joint and then sliding the knife edge along the joint longitudinally so as to split the joint and strip the members from one another.

The invention is advantageously applied in the construction of a show-case, the plates 5, for example, being the end plates of a show-case and the plate 6 being the front plate thereof, the joints above specified being used between the front edges of the end plates and the rear face of the front plate, as shown in Fig. 1, and between the top edges of the front and end plates and the bottom face of the top plate indicated at 10. Said show-case is shown as provided with the usual base 11 and rear frame 12.

The case may be shipped in "knocked down" conditions with the strip 2 and layer 7 attached to or formed on the respective plates, but with the adhesive coating on strip 2 in hard or nonadhesive condition. When the case is to be assembled, the said coatings are moistened by means of a suitable solvent or softened in any other manner, for example, by means of heating, either continuously along their exposed surfaces or at intervals, so that on bringing the cloth strip 9 in contact with the cement on wood strip 2, the parts will adhere to hold the glass plates in proper relative position.

By softening the cement at intervals rather than continuously along the length of the joint, a certain amount of flexibility is secured and the plates are less liable to be subjected to injurious strain by reason of warping. Moreover, by providing a continuous coating of cement which is softened at intervals for attaching the plates together, I am enabled to sever the joint and subsequently attach the plates by softening the cement at different places to those at which it was formerly softened, so that a new cementing surface is provided at each reattachment of the plates. The case may thus be knocked down and built up again by use of the same cementing strip. The use of the open fabric 9 over the opaque coating 7 on the front and top plates masks any irregularities of the cementing such as would result from this production of the bond at intervals, or from shrinking open of the joint if the continuous bond is used. The principle of bonding the glass plate to the support at intervals may also be applied to the attachment of the top plate 10 to the top bar 15 of the rear frame 12 of the show-case. Thus, as shown in Fig. 8, the opaque coating 17 on the top plate may be covered with a cloth strip 18 for concealing the bonds, a felt strip 19 being applied to the top of said frame bar 15 and being bonded to the cloth strip 18 on the top plate 10 at intervals, the cement being applied at such places as indicated at 14 in Fig. 8, and being softened when the case is being assembled.

The invention is particularly applicable to the utilization in show-cases of relatively thin glass plates, for example, double strength window glass, and for this purpose the binding strips may be made with a plurality of wooden layers, connected by felt layers. Thus, as indicated in Figs. 9 and 10, the binding strip comprises a wooden strip 21, a felt layer 22, and an inner wooden strip 23 which may be grooved or scored as indicated at 24 to receive the edge of a double strength glass plate 25, said groove extending to the full depth of the wooden strip 23 or to less depth as may be desired. In this case, the groove 24 may compensate for or mask any inequalities which may exist in the edge of the glass plate secured therein, but it may also be desirable to true up the outer wooden strip 21 before applying the cement 26 thereon to compensate for larger variations than can be taken up by the groove 24.

It will be understood that the function of the felt in the above described construction is to provide a yielding tough body for holding the wood from splitting, and for connecting the wood to the glass, and that instead of felt, any other suitable tough yielding material may be used. Similarly, any suitable fabric may be substituted for the cloth strip which serves as a protection for the opaque layer, the function of this strip being to protect the layer from scratching, etc., in shipment, and to prevent the opaque layer from being pulled off the glass in shrinking of its cement.

An important feature of this invention is the formation of the attaching means on the plates or members before said plates or members are set up or built up into the finished structure. The usual procedure in making a show-case, for example, which is to be shipped "knocked down," is to build up the show-case at the factory, the joint portions being then separated in disassembling the case for shipment. This involves duplication of the work of assembling which is avoided by forming the opaque layer 7 and a strip 2 on the respective plates or members before the same are put together, the said opaque layer and strip serving to mark the joint where the plates are to be attached, as well as providing the attaching means.

What I claim is:

1. The combination of a glass plate having an opaque marking strip cemented thereto, and a supporting member having a cementing strip secured to one edge thereof, said cementing strip being cemented to said marking strip at intervals, and comprising a strip of felt and a wooden strip cemented to said felt strip, said wooden strip having a continuous coating of cementing material attached at intervals to said marking strip.

2. The combination of a glass plate having an opaque marking strip cemented thereto, another glass plate having an irregular edge, a cementing strip composed of a wooden layer and a felt layer cemented to the irregular edge of said second glass plate and having its outer edge formed as a true plane surface and cemented to said marking strip.

3. The combination of a glass plate having a strip cemented to one face thereof, and a second glass plate having a cementing strip secured to one edge thereof, said cementing strip comprising an outer layer of wood and an inner layer of felt, said layers being cemented together, said felt being cemented to said edge of the said glass plate, and the said outer layer of wood being cemented to the aforesaid strip on the first named glass plate.

4. The combination with a glass plate, of a strip provided with a grooved wooden portion embracing the edge of said plate in its groove, a felt portion attached to said wooden portion, another wooden portion attached to the other side of said felt portion, and another glass plate attached to said second wooden portion.

In testimony whereof, I have hereunto set my hand at Los Angeles, California, this 15th day of December, 1910.

NILS H. CEDERQUIST.

In presence of—
A. P. KNIGHT,
FRANK L. A. GRAHAM.

---

Copies of this patent may be obtained for five cents each, by addressing the "Commissioner of Patents, Washington, D. C."